United States Patent
Matsunami et al.

(10) Patent No.: US 10,733,351 B1
(45) Date of Patent: *Aug. 4, 2020

(54) GENERATING WIDTH SPACING PATTERNS FOR MULTIPLE PATTERNING PROCESSES USING INSTANCES

(71) Applicant: Cadence Design Systems, Inc., San Jose, CA (US)

(72) Inventors: Gary Matsunami, Cupertino, CA (US); Karun Sharma, Fremont, CA (US); Sandipan Ghosh, San Jose, CA (US); Yinnie Lee, Campbell, CA (US)

(73) Assignee: Cadence Design Systems, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/872,724

(22) Filed: Jan. 16, 2018

Related U.S. Application Data

(63) Continuation-in-part of application No. 15/425,679, filed on Feb. 6, 2017, now Pat. No. 10,452,806.

(51) Int. Cl.
| | |
|---|---|
| *G06F 30/398* | (2020.01) |
| *G06F 30/394* | (2020.01) |
| *G06F 111/04* | (2020.01) |
| *G06F 111/20* | (2020.01) |

(52) U.S. Cl.
CPC .......... *G06F 30/398* (2020.01); *G06F 30/394* (2020.01); *G06F 2111/04* (2020.01); *G06F 2111/20* (2020.01)

(58) Field of Classification Search
CPC ............. H01L 27/0207; G06F 17/5045; G06F 17/5068; G06F 17/5077; G06F 17/5081; G06F 30/394; G06F 30/398; G06F 2111/04; G06F 2111/20
USPC .................................................. 716/110, 126
See application file for complete search history.

(56) References Cited

U.S. PATENT DOCUMENTS

| | | |
|---|---|---|
| 8,595,662 B1 | 11/2013 | Yu et al. |
| 8,806,405 B2 | 8/2014 | Colwell et al. |
| 9,026,958 B1 | 5/2015 | Ghosh et al. |
| 9,305,133 B1 | 4/2016 | Ghosh et al. |
| 9,372,955 B1 | 6/2016 | Lee et al. |
| 9,384,317 B1 | 7/2016 | Salowe et al. |
| 9,396,301 B1 | 7/2016 | Lee et al. |
| 9,754,072 B1 | 9/2017 | Salowe et al. |
| 2002/0178429 A1 | 11/2002 | Nakayama et al. |
| 2003/0009736 A1 | 1/2003 | Suto |
| 2008/0120586 A1 | 5/2008 | Hoerold |
| 2012/0131528 A1 | 5/2012 | Chen et al. |
| 2012/0223472 A1 | 9/2012 | Kirk et al. |

(Continued)

*Primary Examiner* — Paul Dinh
(74) *Attorney, Agent, or Firm* — Foley & Lardner LLP

(57) ABSTRACT

Embodiments according to the present disclosure relate to physically implementing an integrated circuit design while conforming to the requirements of complex color based track systems, and using information about instances that have been included in the design. In particular, the present embodiments allow for the automatic creation of WSPs by examining heights and placement orientations of instances, along with the width, spacing, and colors of instance pins and blockages. In these and other embodiments, techniques are provided for filling gaps between generated tracks, as well as for generating tracks to account for the possibility of flipped or mirrored instances.

18 Claims, 16 Drawing Sheets

(56) References Cited

U.S. PATENT DOCUMENTS

| | | | |
|---|---|---|---|
| 2012/0241986 A1* | 9/2012 | Sherlekar | H01L 27/0207 257/784 |
| 2015/0040077 A1 | 2/2015 | Ho et al. | |
| 2015/0213184 A1 | 7/2015 | Yuan et al. | |
| 2017/0193148 A1 | 7/2017 | Liu | |
| 2018/0173837 A1 | 6/2018 | Won et al. | |

* cited by examiner

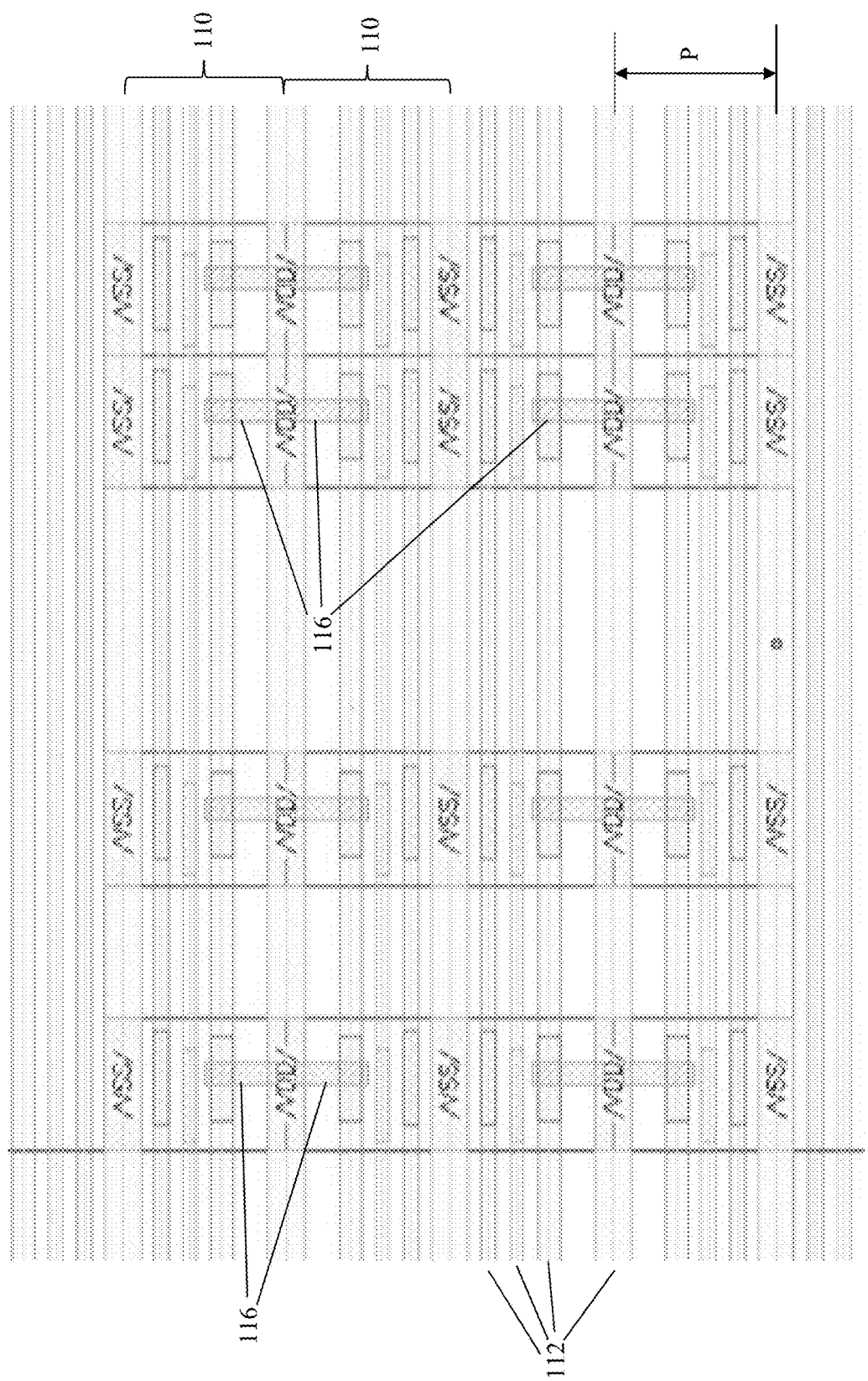

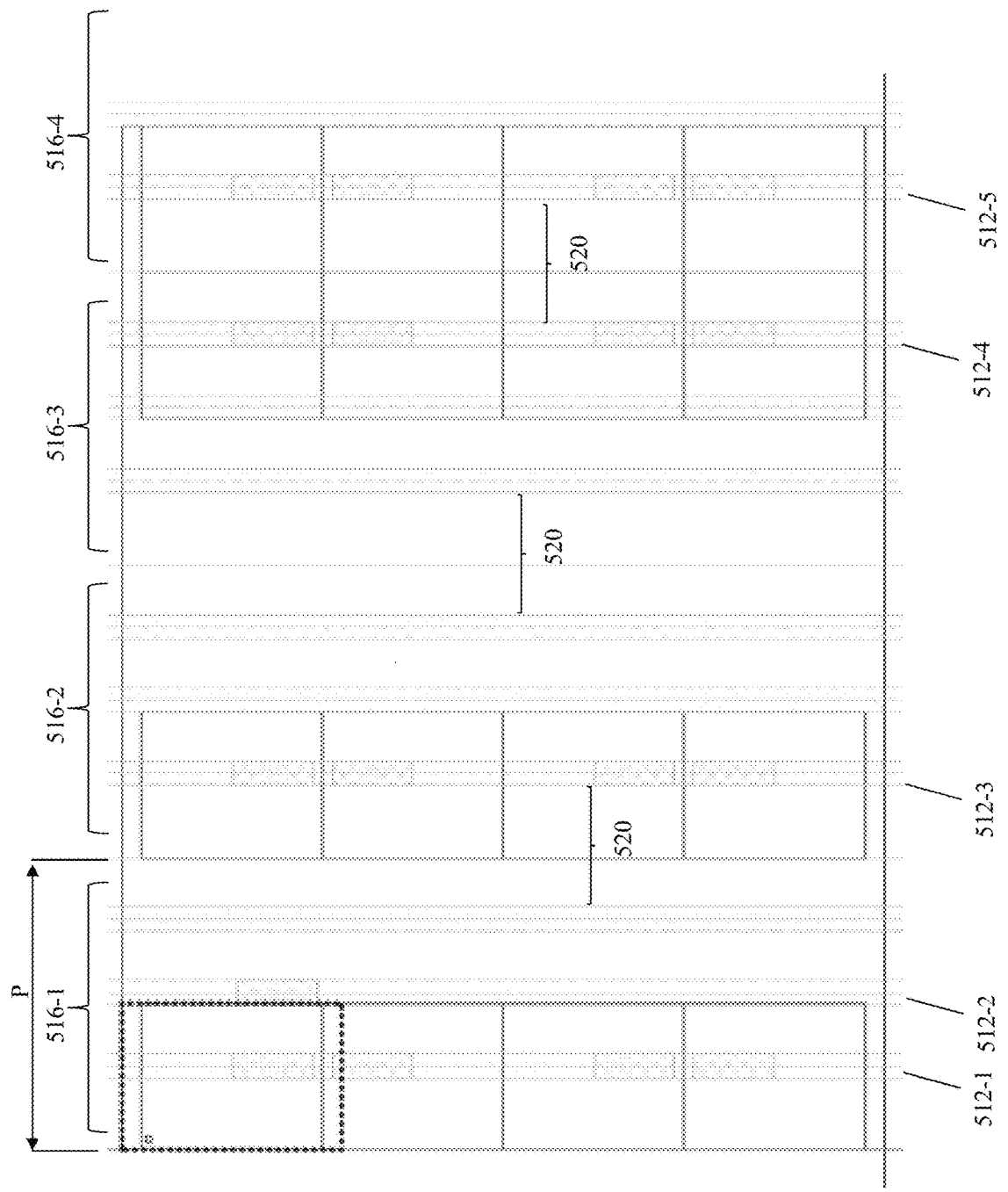

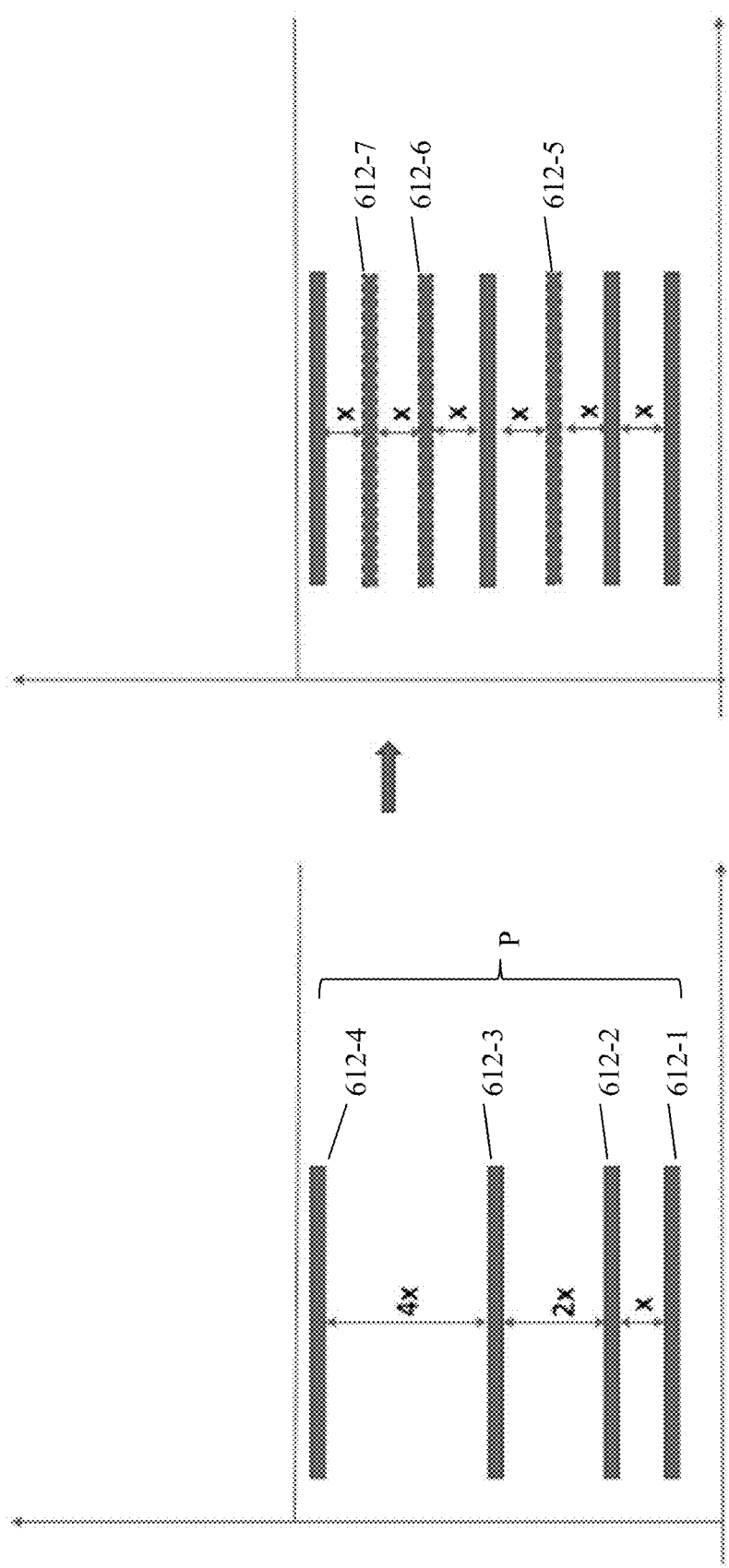

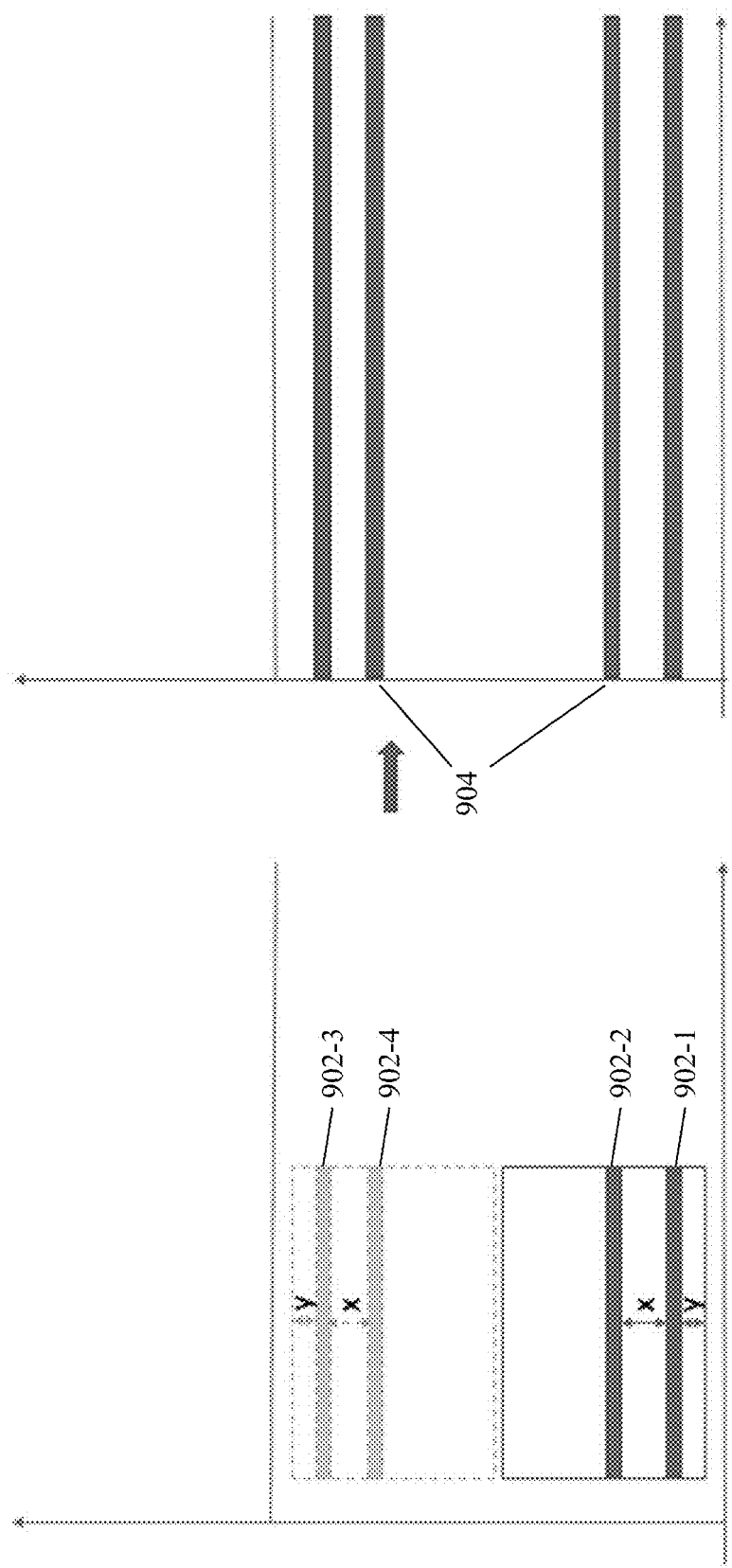

GENERATING WIDTH SPACING PATTERNS FOR MULTIPLE PATTERNING PROCESSES USING INSTANCES

CROSS-REFERENCE TO RELATED APPLICATIONS

The present application is a continuation-in-part of U.S. Patent Application No. 15/425,679 filed Feb. 6, 2017, the contents of which are incorporated herein by reference in their entirety.

TECHNICAL FIELD

The present disclosure relates to integrated circuits, and more particularly to techniques for implementing designs of integrated circuits in processes that include coloring for multiple patterning and track based systems.

BACKGROUND

Electronic design automation (EDA) tools are used to design electronic circuits such as integrated circuits. Integrated circuits can include many thousands and perhaps millions of circuit elements (e.g., transistors, logic gates, diodes, etc.) and interconnecting wires and busses. The circuit elements and wires can be formed on many different layers, with various interconnections (e.g., vias) between layers. EDA tools allow a designer to describe an integrated circuit based on its desired behavior, and then transform that behavioral description into a set of geometric shapes called a layout which forms the circuit elements and wires for all the different layers.

EDA tools further allow certain components to be specified at a high level of abstraction and then replicated many times in the overall integrated circuit, each being called an "instance," at lower levels of abstraction and placed on different layers of the integrated circuit. Any given instance can include dozens or more geometric shapes, and some shapes in the same instance can be placed in different layers, for example to allow for shapes to be aligned with different tracks or other specified directions associated with different layers. Instances can also include "pins," which are elements that allow the instance to be connected with other components via wires and busses for example.

As integrated circuit feature sizes continually get smaller and smaller (e.g., 10 nm and below), EDA tools need to be aware of an ever-increasing number of constraints (i.e., design rules or design rule manuals (DRMs)) to ensure that shapes are placed correctly for a target fabrication process. For example, some foundries specify that shapes of a design can only be placed in parallel routing tracks (hereinafter "tracks") running in one direction of a given layer or portion of a layer and shapes in these tracks must conform to certain legal width requirements (e.g., having a specific one of a number of pre-specified legal widths). Moreover, to allow a design to be implemented by multiple patterning processes (e.g., double patterning, self-aligned double patterning (SADP), etc.), shapes in adjacent tracks of a given layer of an integrated circuit may have alternate colors (e.g., B for shapes to be included in a "blue" photomask, C for shapes to be included in a "cyan" photomask, etc.) and the widths for shapes in adjacent tracks may need to conform to further requirements.

Patterns of tracks can be specified for an integrated circuit design, wherein a set of adjacent tracks have associated widths, spacing and colors (e.g., non-uniform width spacing patterns (WSPs)), and these patterns can be repeated in a given layer with a corresponding period. Tracks themselves have zero width and no components in physical designs (e.g., a layout of an electronic design) and are merely used to guide physical implementation tools (e.g., floorplanner, placement tools, or routing tools) to implement the physical design for an electronic circuit. For example, a routing tool may lay the centerline of a wire segment along a routing track during the routing process. The width associated with a particular routing track is used to route wires having shapes with the associated width.

Track patterns are not always provided by the technology and in those cases they must be created as part of the design process. The process of generating colored track patterns, having non-uniform width and/or spacing, can be very complex.

SUMMARY

Embodiments according to the present disclosure relate to physically implementing an integrated circuit design while conforming to the requirements of complex color based track systems, and using information about instances that have been included in the design. In particular, the present embodiments allow for the automatic creation of WSPs by examining heights and placement orientations of instances, along with the width, spacing, and colors of instance pins and blockages. In these and other embodiments, techniques are provided for filling gaps between generated tracks, as well as for generating tracks to account for the possibility of flipped or mirrored instances.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIGS. 1A to 1C are diagrams illustrating example aspects of generating track patterns in an integrated circuit design according to the present embodiments;

FIGS. 5A to 5C are diagrams illustrating aspects of the methodology of FIG. 4 according to embodiments;

FIGS. 6A and 6B are diagram illustrating additional aspects of the methodology of FIG. 4 according to embodiments;

FIGS. 9A and 9B are diagram illustrating additional aspects of the methodology of FIG. 7 according to embodiments;

DETAILED DESCRIPTION

Figure 1A:
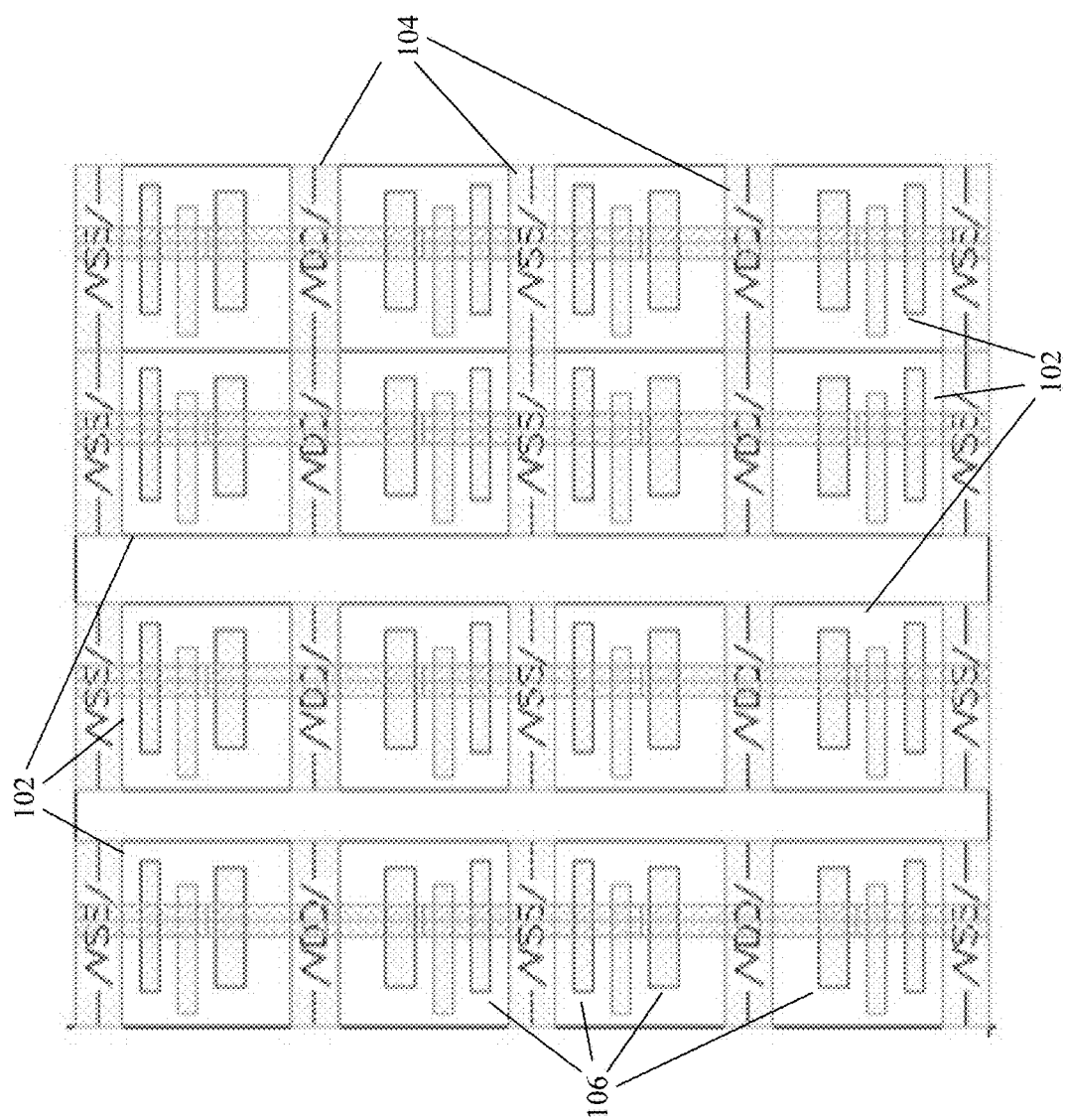

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments relate to physically implementing integrated circuit designs such that they conform to complex constraints imposed by fabrication processes. According to certain additional aspects, the present embodiments relate to providing EDA tools that are aware of these constraints and are adapted to implement designs that conform with them.

For example, some fabrication processes require all circuit elements to be located in tracks having specified widths and that are separated by specified gaps. These tracks are generally specified to run in a single direction on a given layer or designated portion or region of a layer of the integrated circuit. For example, the tracks on one layer may be specified to run in a vertical or north-south direction, while the tracks on an adjacent layer above or below may be specified to run in a horizontal or east-west direction. In some fabrication processes, the tracks are specified to have uniform widths and uniform spacing. However, at process nodes of 10 nm and below, integrated circuit designs may need to conform to complex track systems called width spacing patterns ("WSPs").

Another constraint of which EDA tools need to be aware are those imposed by multiple patterning processes, of which double patterning (DP) is a common example. These processes separate a layout into two or more patterns, which are then separately imaged onto the same layer of the integrated circuit using separate masks. The process of separating a layout into two or more patterns is called "coloring." In the coloring process, each shape in the design is assigned to one of the multiple patterns or is figuratively "colored" with a color respectively associated with the assigned pattern. In other words, all shapes assigned to the same pattern in a given layer share the same color.

Some integrated circuit processes include both track and coloring constraints. In such cases, not only are shapes assigned to specified patterns or associated colors, tracks are also assigned to specified patterns or associated colors. Typically, for a double patterning process, adjacent tracks are assigned to alternating colors, with similar types of assignment schemes for higher order patterning processes. Design rules for a process that governs which tracks associated with certain widths may be situated immediately adjacent to another track associated with a width are referred to as pair rules or BC rules where B stands for blue and C stands for cyan in a double patterning processes. Design rules governing which three-width combinations are legal are referred to as triplet rules or BCB rules.

In the early stage of a design, it is often the case a designer will have several instances already placed in certain locations of the design, but will not have a track pattern that can be applied to the entire block or design to facilitate the rest of the design process. In this case it is desirable to have a tool to generate a design rule correct track pattern to facilitate the design process.

Currently the only method for automatically generating WSPs for layout design is a precompiled approach (.so) using BCB rules. This methodology using BCB rules generates multiple (sometimes thousands of) patterns and a user is required to select one from them. Moreover, this methodology requires a large precompiled pattern library for each foundry which needs to be recompiled when the spacing rules change.

Many technologies don't have BCB rules but still need to generate optimized patterns from pin locations, and they need the patterns to be design rule correct. For WSP aware design flows this is an essential step now in starting the design process. Current methods for non-BCB technologies are generically guess and check.

According to certain aspects, therefore, the present embodiments relate to automatically generating track patterns for implementing an integrated circuit design, which patterns satisfy process and design rules and also conform to user defined inputs. In particular, the present embodiments allow for the automatic creation of WSPs by examining heights and placement orientations of instances, along with the width, spacing, and colors of instance pins and blockages. In these and other embodiments, techniques are provided for filling gaps between generated tracks, as well as for generating tracks to account for the possibility of flipped or mirrored instances.

Figure 1C:
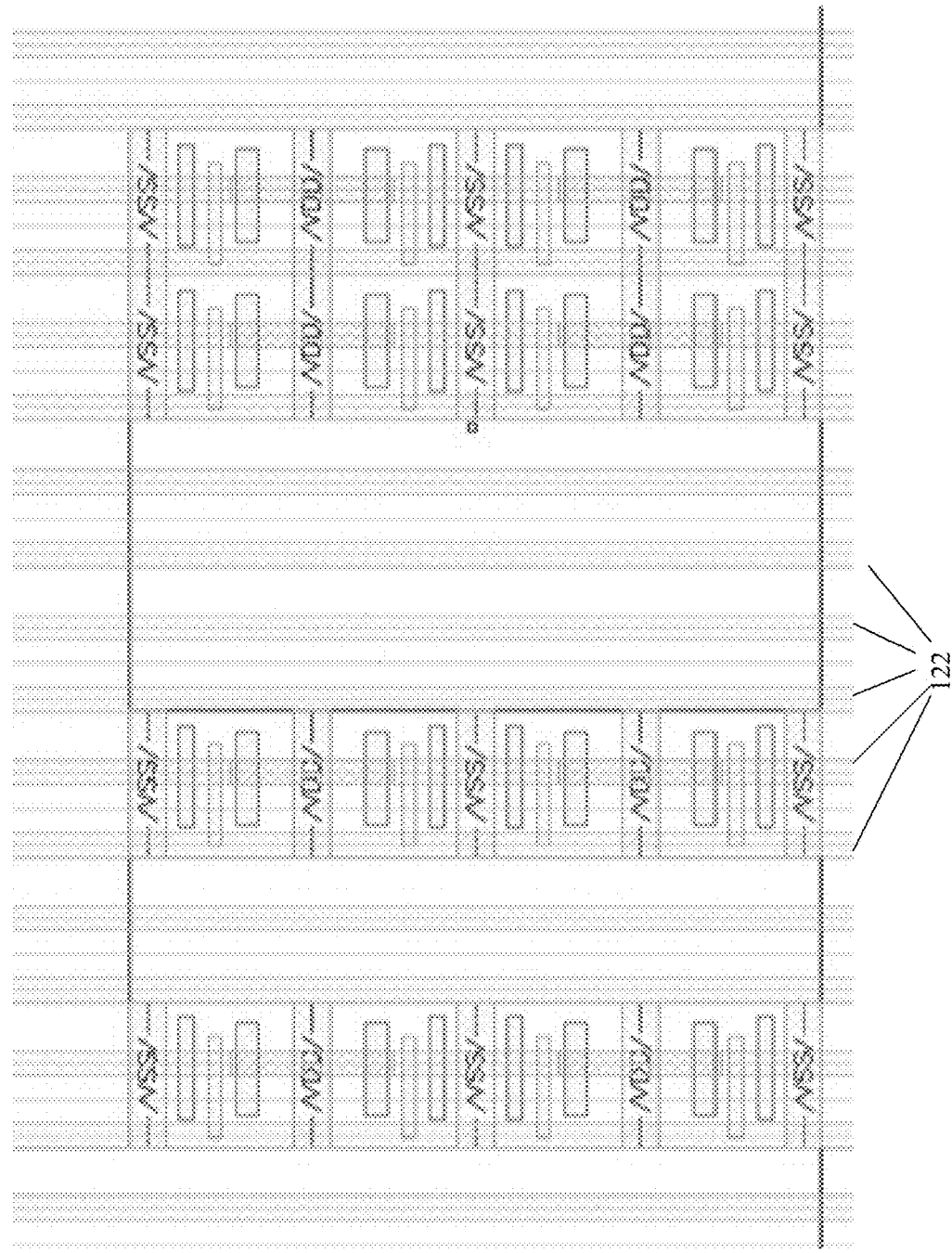

FIGs. 1A to 1C illustrate certain aspects of the present embodiments.

As shown in FIG. 1A, in standard cell designs for advanced nodes (e.g., 10 nm and below), the instances 102 are typically placed in a uniform, row based format. For example, in a common standard cell design, the instances 102 are placed in rows with cells aligned vertically to share horizontally oriented power grid rails 104 (e.g., rails for power and ground nets such as VDD, VSS, etc.) in a layer of the design. As further shown in the example of FIG. 1A, in the same layer as power grid rails 104, the instances 102 include horizontally oriented shapes corresponding to pins 106. According to certain aspects, the present applicant recognizes that it would be desirable to have a utility to generate track patterns at a stage of the design process after some or all of the instances have been placed in the design, but before a routing process is performed. After the track patterns have been generated, they can be used to help guide the routing process.

As shown in FIG. 1B and as will be described in more detail below, for a metal layer in which horizontal tracks need to be generated, the present embodiments take the number of color masks for that layer and create WSPs that match the instance pins. More particularly, as shown in the example of FIG. 1B, using the pins 106 and power rails 104 of instances 102, the present embodiments create WSPs in the layer in which pins 106 and their instances 102 are located, the WSPs having a period P, with each period or row having the same set 110 of tracks 112 with colors, widths and spacing established using the pins 106 and power rails 104 in the instances 102.

According to additional aspects, the present embodiments can further create WSPs for additional layers using the same instances for which WSPs were previously created. For example, with reference to FIG. 1B, instances 102 can include vertically oriented shapes corresponding to pins 116 in an adjacent upper metal layer to the layer in which pins 106 are located. Accordingly, as shown in FIG. 1C and as will be described in more detail below, for the adjacent upper metal layer having vertically oriented shapes, the present embodiments create WSPs having vertically oriented tracks 122 with colors, widths and spacing established using the pins 116 in the instances 102.

Examples of how WSPs can be created using instances according to the present embodiments will now be described in more detail.

One example methodology according to embodiments will be described in connection with the flowchart in FIG. 2 and an example WSP illustrated in FIGS. 3A and 3B.

In a first step S202, a period for the WSP to be created in a given layer is determined. For example, all of the instances having shapes in the layer are identified from the design. Then, all of the vertical heights for the instances are determined, for example, by extracting the dimension information for each instance from the design. In one embodiment, a least common multiple of all of the determined cell heights is chosen as the period. For example, if the smallest cell height is x, and if other cell heights include 2x and 6x, the largest cell height 6x is chosen as the period. Accordingly, having determined the period P, as shown in the example of FIG. 3A, periods or rows 302-1, 302-2 and 303-3 of the WSP in the design are established.

In a next step S204, all of the shapes for any instances in the layer are identified. This is done by examining information for all the instances from the design and cataloging all of the shapes from all of the instances having shapes in the layer and tagging them with their vertical locations with respect to the period P. Accordingly, as shown in the example of FIG. 3A, shape 304-1 is identified in the first period 302-1 and its vertical offset V1 from the start of the period 302-1 is determined. Likewise, shape 304-2 is identified in an adjacent second period 302-2 and its vertical offset V2 from the start of period 302-2 is determined. Similarly, shape 304-3 is identified in a third adjacent period 302-3 and its vertical offset V3 from the start of period 304-3 is determined.

In a next step S206, all the identified shapes are projected into the first period at their corresponding offsets. For example, as shown in FIG. 3A, shapes 304-2 from row 302-2 is projected into period 304-1 at an offset of V2 and shape 304-3 from row 302-3 is projected into period 302-1 at an offset of V3, along with pre-existing shape 304-1 at an offset of V1.

In a next step S208, a check is performed. For example, first it is determined if the projection of shapes in step S206 results in any overlapping shapes at a given offset (e.g., such as vertical offsets V1, V2 or V3 in FIG. 3B). If so, it is further determined whether the overlapping shapes have different widths, or different assigned colors (if any colors have been assigned to the shapes) in a multiple patterning scheme. If so, this will be flagged as an error condition in this example. In other examples, user preferences can be consulted to determine what is done, including whether such conflicts are flagged as errors, whether overlapping tracks are created, or to make a default color or width choice specified by the user.

Moreover, whether or not there are overlapping shapes, step S208 further includes determining whether the pattern of projected shapes from step S206 complies with coloring rules. For example, as shown in FIG. 3B, the shapes 306-1, 306-2 and 306-3 have respective different colors in a multiple patterning scheme. These colors are compared to the valid colors of the particular multiple patterning scheme, for example, to verify that the three different colors of shapes 306-1, 306-2 and 306-3 match all the colors of the patterning scheme, which in this example would have to be a three color multiple patterning scheme. Moreover, the colors of the shapes are further verified to make sure they alternate in accordance with the particular multiple patterning scheme. For example, as shown in FIG. 3B, starting from the bottom of the period, step S208 includes verifying that the color of shape 306-2 is different than next adjacent shape 306-3, that the color shape 306-3 is different than next adjacent shape 306-1 and that the color of last shape 306-1 in period 302-1 will be different than the color of the first shape corresponding to shape 306-2 in the next period 302-2. If any of the coloring rules for the particular multiple patterning scheme are violated, this can be flagged as an error condition.

It should be noted that in some embodiments, some or all of the shapes in the design may not have assigned colors at this stage of the design process. In this case, step S208 can include determining whether any shapes without an assigned color can be assigned a color that results in a valid coloring scheme for all shapes in the first period.

Moreover, a set of design rules, requirements, or constraints (hereinafter design rules or rules collectively) that govern tracks, track patterns, or interconnections between pins or implementation of electronic designs may be identified in step S208 (either independently or by a separate design rule checker). Illustrative design rules may include, for example, a minimum length rule governing the minimum length required for an interconnect segment, a span length spacing design rule, allowed width ranges, a different track line-end design rule, a keep-out design rule, or one or more design rules governing repetitive track patterns, etc.

Figure 2:
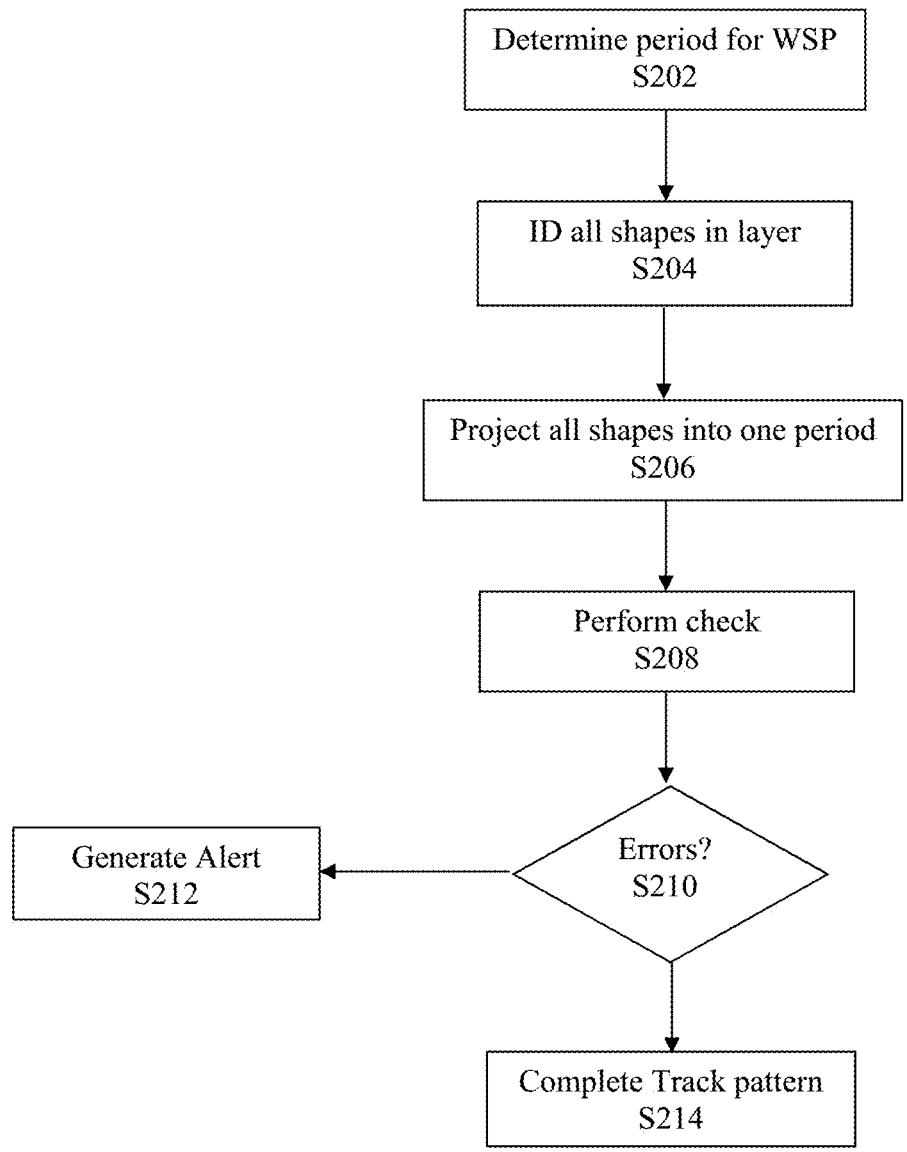
FIG. 2 is a flowchart illustrating an example methodology for generating track patterns in an integrated circuit design according to the present embodiments.
Figure 3:
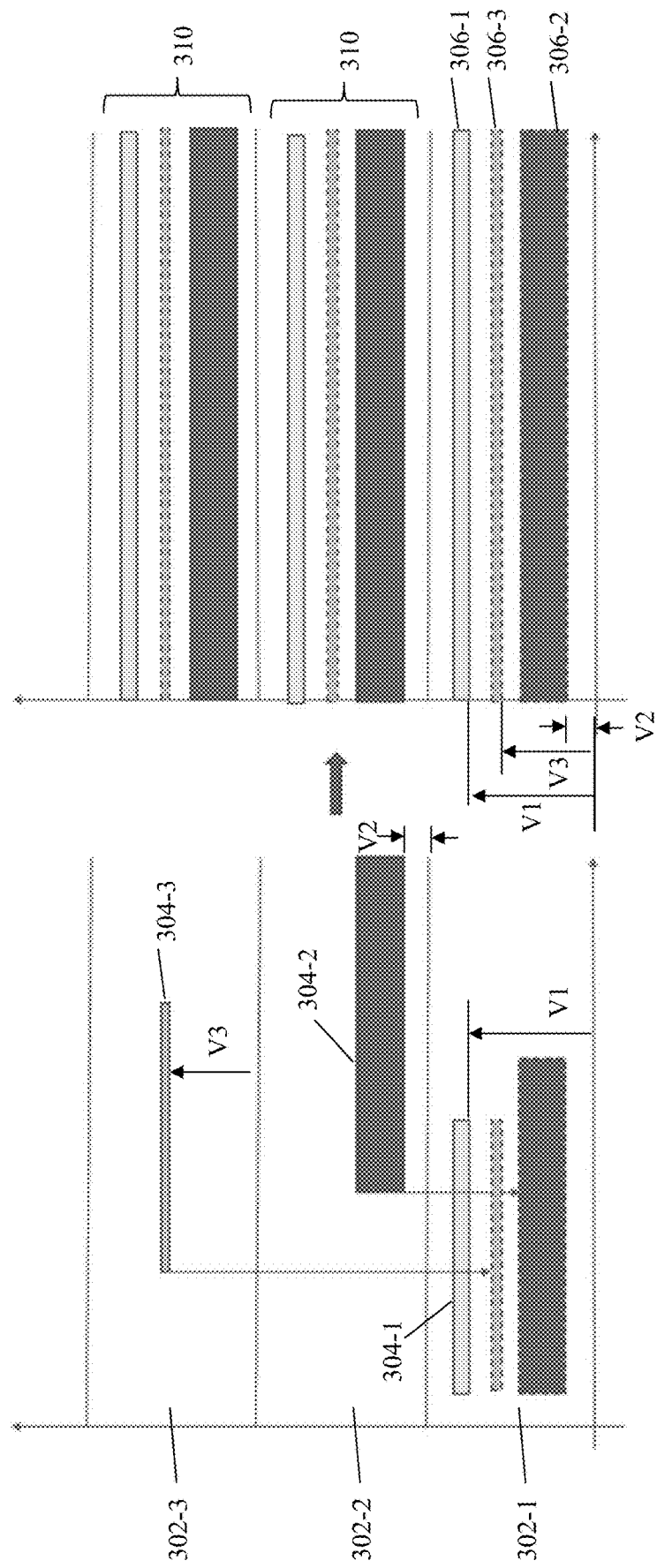
FIGS. 3A and 3B are diagrams illustrating aspects of the methodology of FIG. 2 according to embodiments.

If it is determined in step S210 that there are any unfixable error conditions from the check performed in step S208, the process can end with an alert being generated as shown in step S212 of FIG. 2. Otherwise, processing can complete in a next step S214, where tracks are created using the widths and colors of the projected shapes from the first period. For example, as shown in FIGS. 3A and 3B, based on shapes 304-1, 304-2 and 304-3 projected into row 302-1, tracks 306-1, 306-2 and 306-3 are created with the color and widths corresponding to those shapes, and with the corresponding vertical offsets from the period. As further shown in FIG. 3B, the tracks in the first period are repeated at the determined period for the layer to form WSPs 310.

Figure 4:
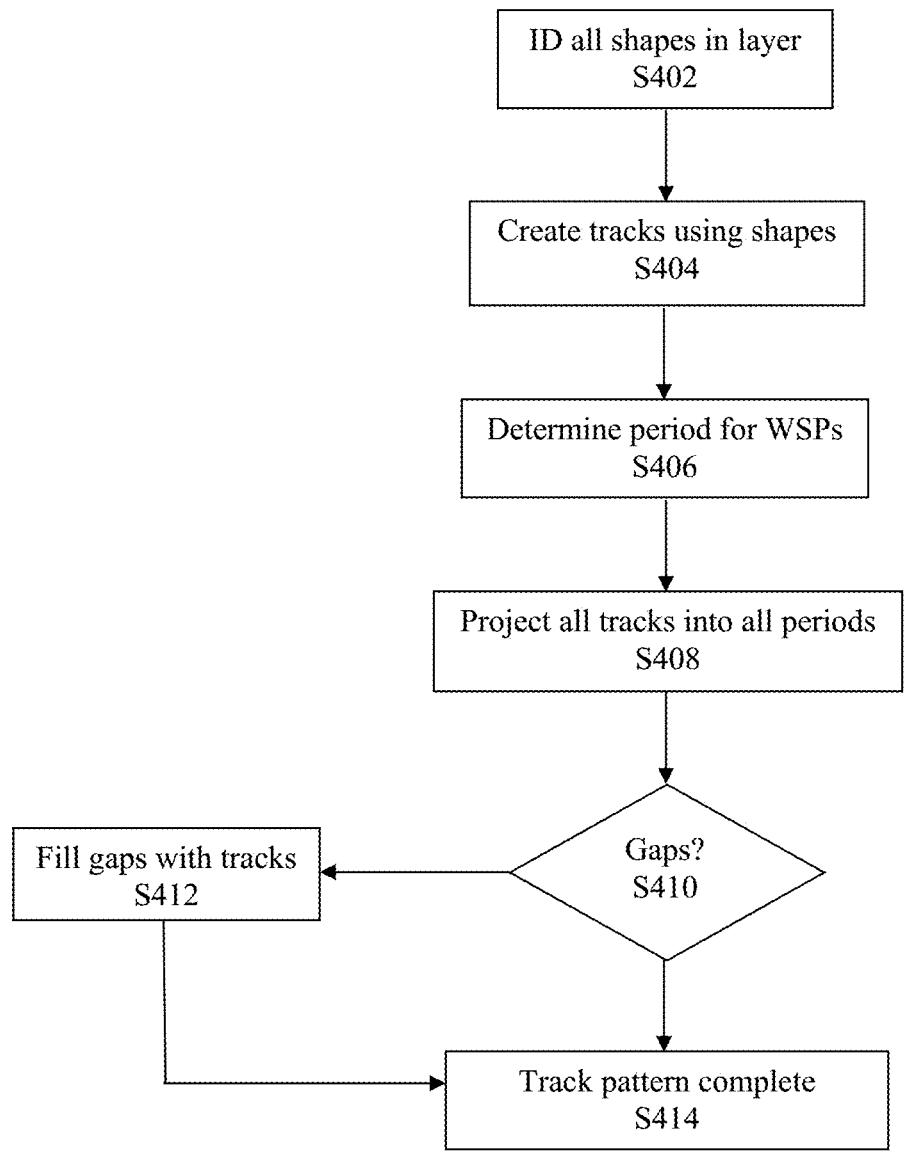
FIG. 4 is a flowchart illustrating another example methodology for generating track patterns in an integrated circuit design according to the present embodiments.
Figure 5A:
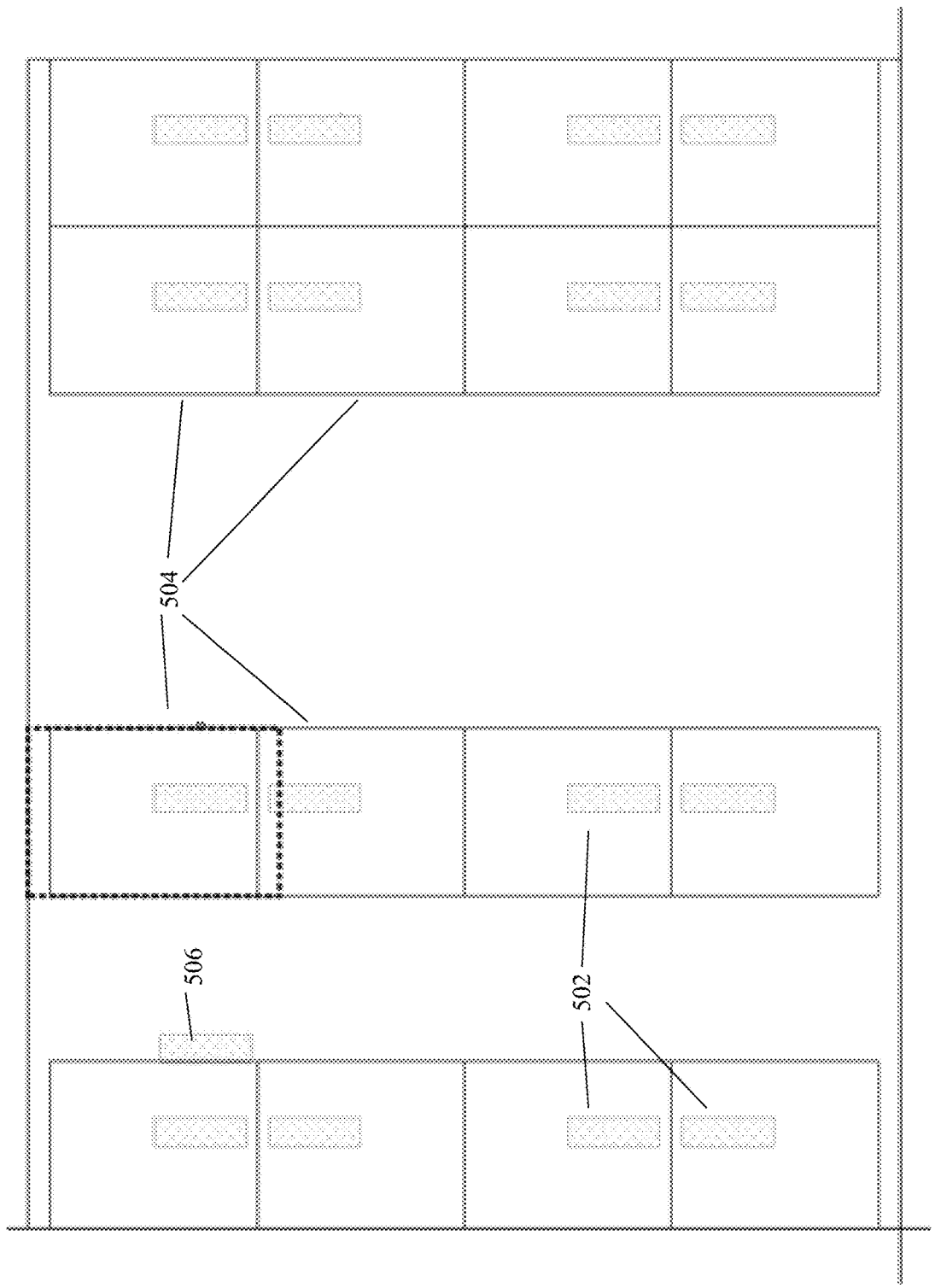
Figure 5C:
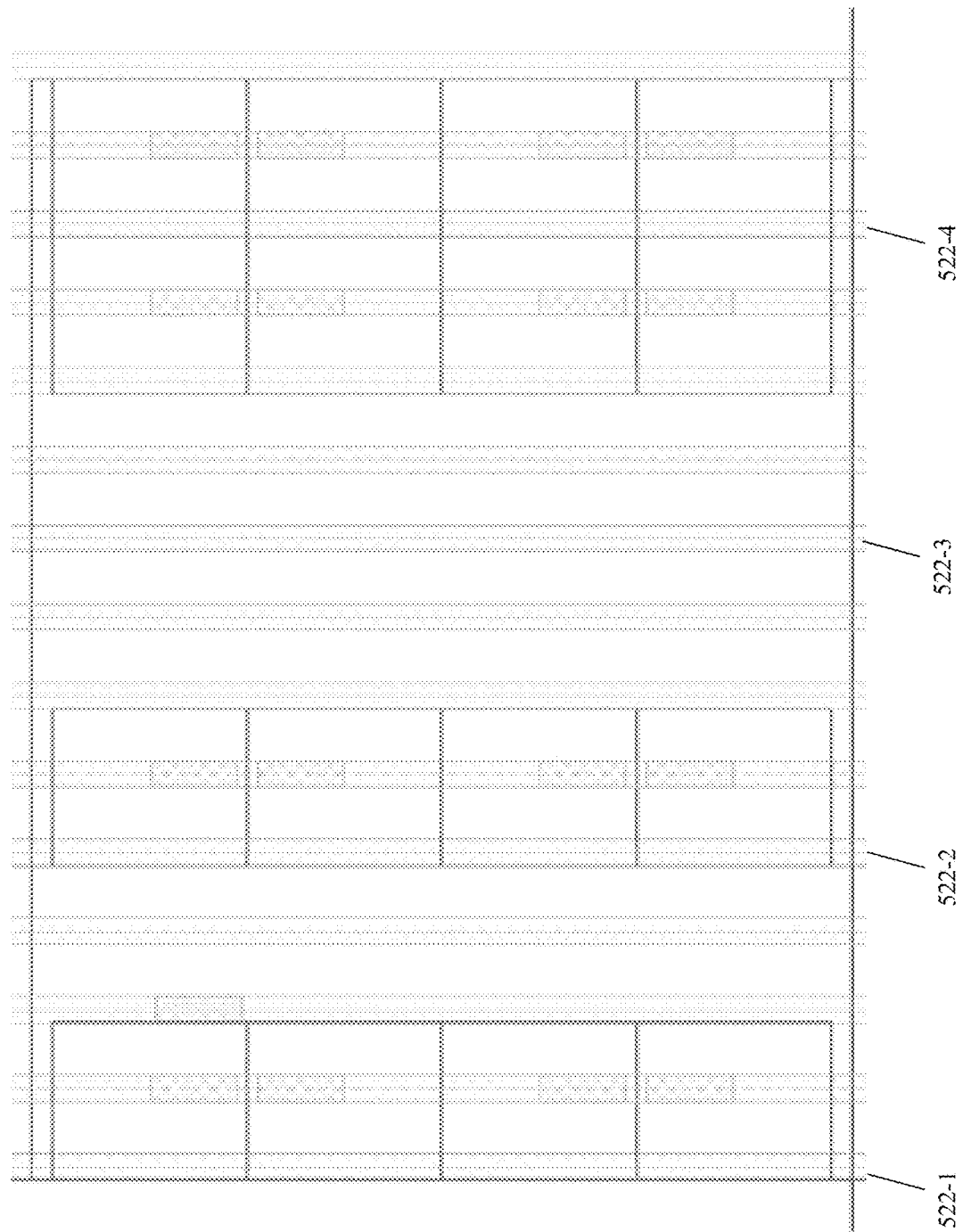

As set forth above, in embodiments, additional WSP creation processing can be performed for other layers adjacent to the layer for which WSPs were created such as those shown in FIG. 3B and using the same instances that were used in that creation process. An example methodology according to these embodiments is described below in connection with the flowchart of FIG. 4 and an example layout as shown in FIGS. 5A to 5C.

In a first step S402, all shapes in the layer are identified. This can be done similarly as set forth above in step S204 of the method in FIG. 2. For example, as shown in FIG. 5A, all shapes 502 corresponding to pins in instances 504 are identified, as well as any other shapes 506 in the layer or valid levels. It should be noted that some instances may include top level or level 0 pins, and these pins may not be placed in the optimal location. Accordingly, in some embodiments, these pins are excluded from the shapes identified in step S402. In alternative embodiments, if the pins are passed down from a top-level design and a designer wants to include them, an optional parameter can be specified by the designer so that the method identifies them in step S402 and uses them to perform track generation as set forth below. Additionally or alternatively, the pins can be excluded from track generation and a designer can later optimize the pins and snap them to created WSPs.

In a next step S404, tracks are created using the widths and colors of the identified shapes. For example, as shown in FIG. 5B, based on identified shapes 502, tracks 512 are created with the color and widths corresponding to those shapes. As can be seen in this example in FIG. 5B, where the layer is an upper layer adjacent to a lower layer having horizontally oriented tracks such as those shown in the example of FIG. 3B, the tracks created for this layer have a vertical orientation.

In a next step S406, a period for the WSPs is determined based on the created tracks from step S404. For example, starting from one edge of the design, step S404 includes adding adjacent tracks to a group one-by-one and identifying the smallest group that repeats in terms of actual and potential track locations and gaps. Accordingly, as shown in the example of FIG. 5B, a period P is determined.

In a next step S408, all generated tracks are projected so as to be replicated in all periods of the pattern. For example, as shown in FIG. 5B, it is determined that the first period 516-1 does not include track 512-4 from period 516-3 and so this track 516-4 is projected into period 516-1. Likewise, period 516-2 does not include tracks 512-2 from period 516-1 and track 516-4 from period 516-3, so these tracks are projected into period 516-2. This process is repeated for all periods.

In a next step S410, a check is performed. For example, when shapes are sparsely distributed in a design, the derived pattern may have gaps, such as gaps 520 in the example of FIG. 5B. If any such gaps are detected, such as a space between tracks exceeding a given threshold, processing continues to step S412. Otherwise, processing ends in step S414 where the WSP generation process for this layer is complete.

To reduce the empty gaps, processing in step S412 can include checking for possibilities extra tracks can be generated to fill the gaps. For example, based on the periodicity in the generated pattern shown in FIG. 5B, extra tracks 522-1, 522-2, 522-3 and 522-4 are added in gaps 520 as shown in FIG. 5C to complete the WSP generation process for this layer.

One example of this process is described in more general detail in FIGS. 6A and 6B. As shown in FIG. 6A, a set of tracks 612 have been generated for a pattern having a period P. Within the determined period, track 612-3 is separated a distance from track 612-2 by twice the amount as the separation between tracks 612-1 and 612-2. Moreover, track 612-4 is separated from track 612-3 by four times the amount of the separation between tracks 612-1 and 612-2. Accordingly the separation between tracks 612-1 and 612-2 is determined to be a least common separation factor (i.e., the separation lx shown in FIG. 6A), and this least separation is used to generate extra tracks 612-5, 612-6 and 612-7 where none previously existed.

Figure 7:
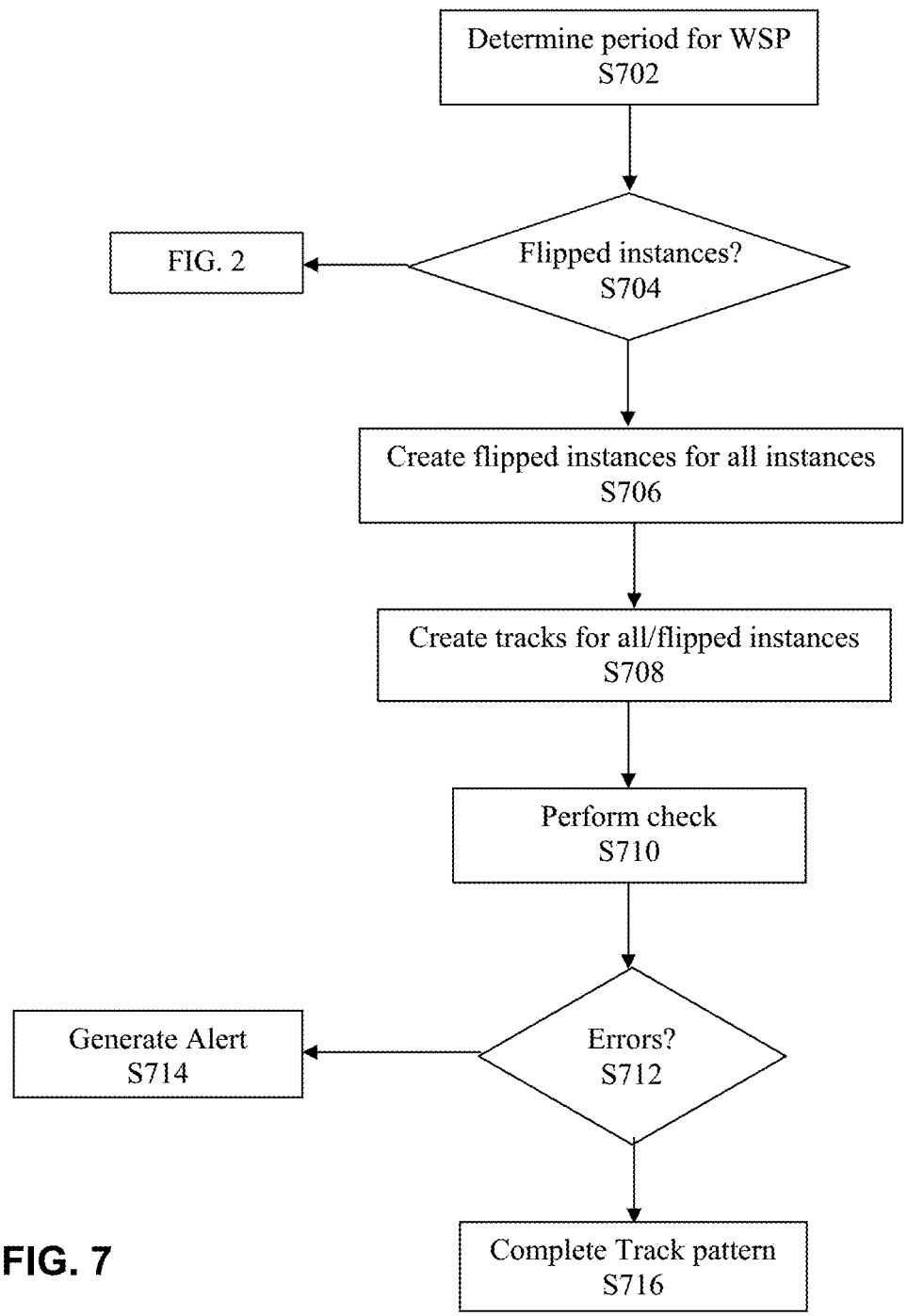
FIG. 7 is a flowchart illustrating another example methodology for generating track patterns in an integrated circuit design according to the present embodiments.

Another example of where tracks can be inserted without using shapes while generating WSPs is when the design can include flipped instances. One example methodology according to these and other embodiments will be described in connection with the flowchart in FIG. 7 and an example WSP illustrated in FIGS. 8A to 8C.

In a first step S702, a period for the WSP is determined. This can be done similarly as that described above in connection with step S202. Accordingly, as shown in the example of FIG. 8A, instances 802-1 and 802-2 in adjacent rows of the design are identified, as well as the period P.

In a next step S704, it is determined whether there can be flipped instances in the design. According to certain aspects, the presence of any flipped instances in the design triggers generation of flipped/mirrored tracks for WSPs according to the present embodiments. This enables creation of patterns that allow the instances to be placed with both R0/MY and R180/MX orientations in the design as will be described in more detail below. Otherwise, further processing can be performed as described in connection with FIG. 2, for example.

Figure 8A:
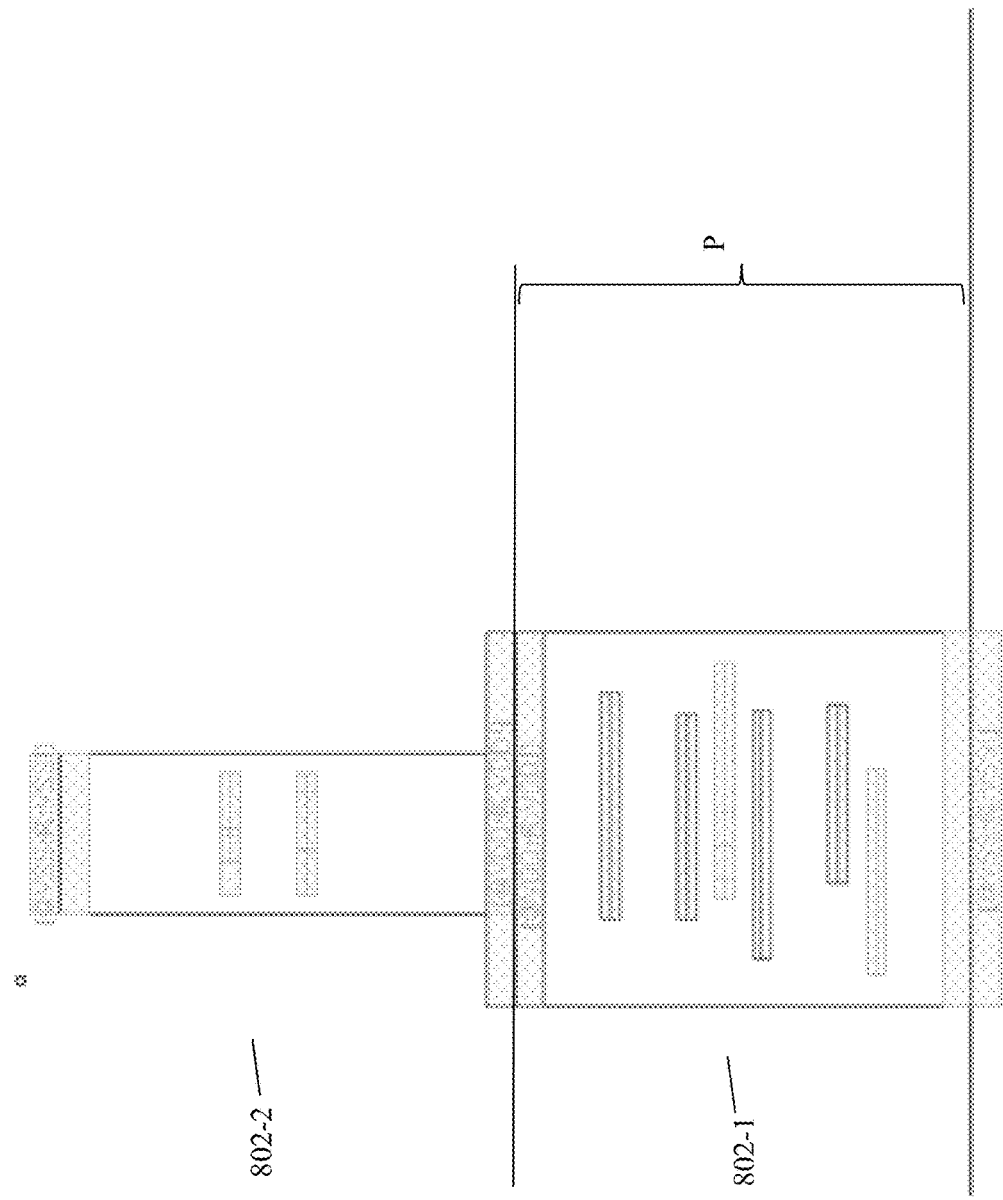
FIGS. 8A to 8C are diagrams illustrating aspects of the methodology of FIG. 7 according to embodiments.
Figure 8B:
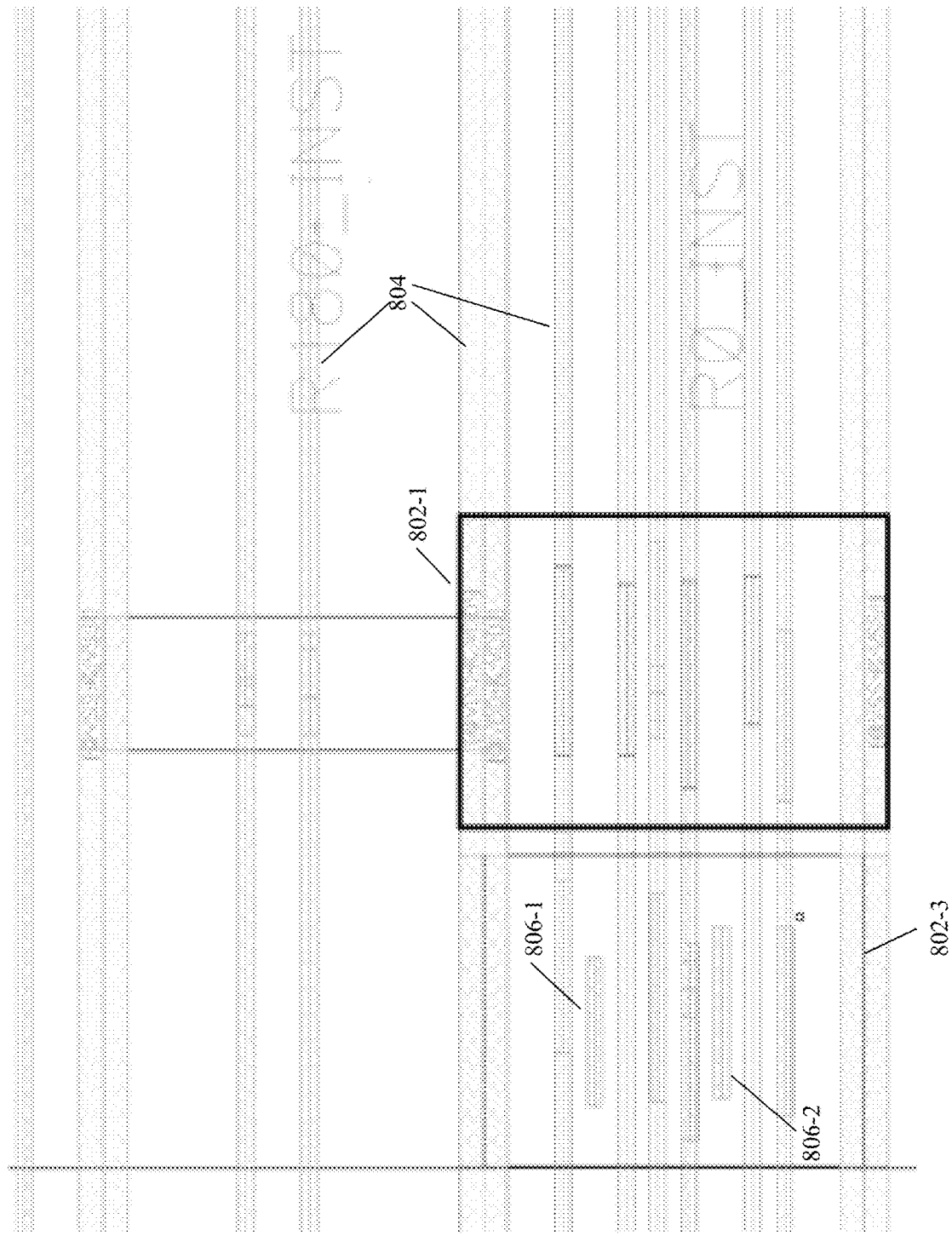

To further illustrate aspects of generating flipped/mirrored tracks, the pattern that can be derived by only looking at the shapes of instances 802-1 and 802-2 in FIG. 8A according to the embodiments described above in connection with FIGS. 2 and 3 leads to the pattern of tracks 804 shown in FIG. 8B. As further shown in FIG. 8B, if the user tries to place the instance 802-1 with a flipped orientation as illustrated by 802-3 (as projected into the same row as instance 802-1 for illustration purposes), then it can be seen that two of the shapes 806-1 and 806-2 do not have a track underneath them.

According to certain aspects, therefore, the present embodiments attempt to remedy this by pre-inserting flipped tracks. As such, in a next step S706, flipped instances are created for all existing instances and projected into the base row. For example, as shown in FIG. 9A, an instance has pins 902-1 and 902-2, with pin 902-1 at a spacing of y from the bottom of the period P and pin 902-2 at a spacing of x from pin 902-1. When this instance is flipped in the same row, this will create corresponding pin 902-3 at a spacing of y from the top of period P and pin 902-4 at a spacing of x from pin 902-3.

In a next step S708, tracks are created using the widths and colors of the projected shapes. For example, as shown in FIG. 9B, based on shapes 902-3 and 904-4 projected into the same row as shapes 902-1 and 902-2, tracks 904 are created with the color and widths corresponding to those shapes.

In a next step S710, a check is performed. This step can be performed similarly as in step S208 described above in connection with FIG. 2, and can include determining whether there are any overlapping tracks with color or width discrepancies.

Figure 8C:
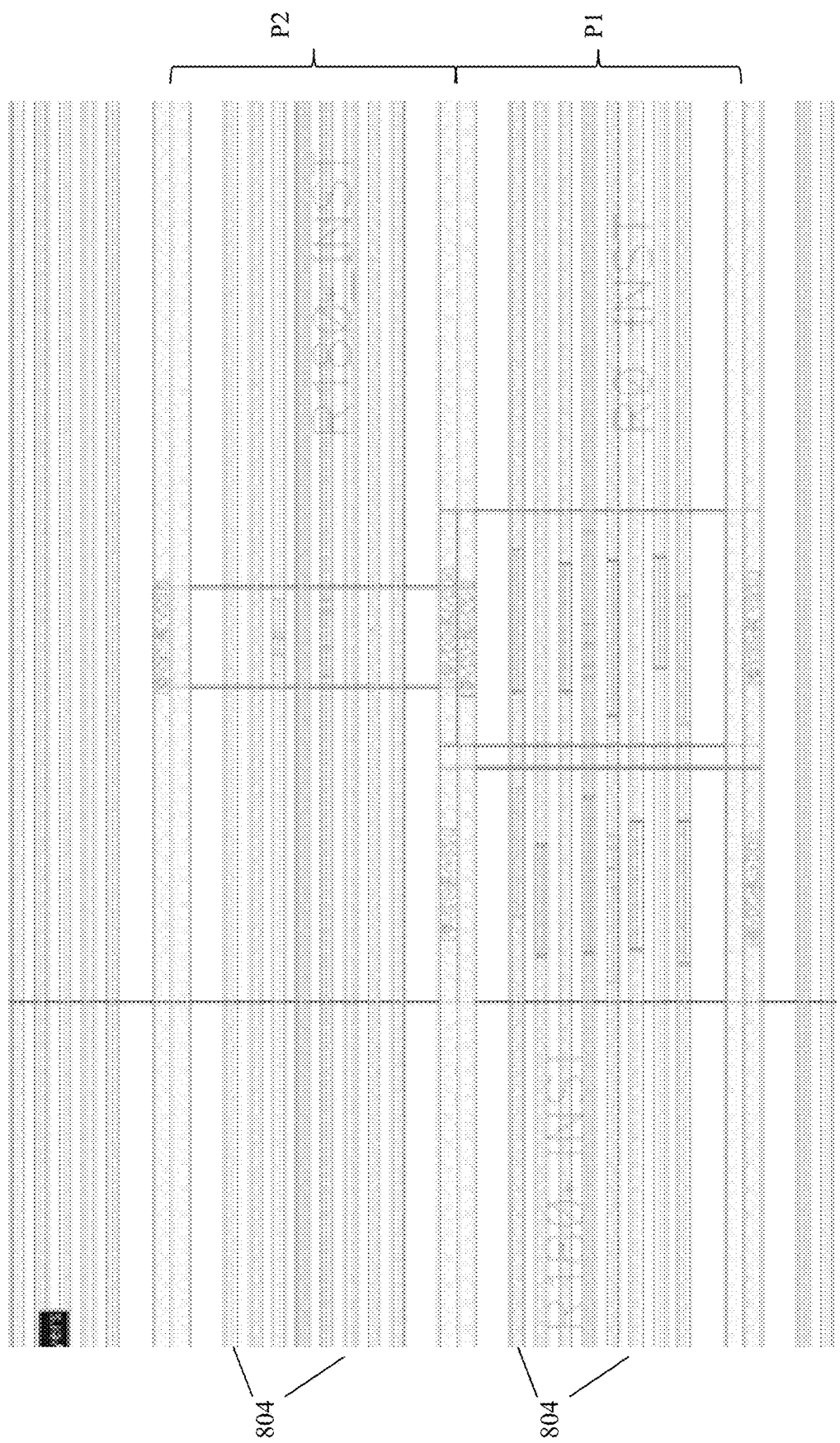

In a final step S716, if there are no errors as determined in step S712, the tracks in the first period are repeated at the determined period for the layer. For example, as shown in FIG. 8C, the tracks 804 created for the first period P1 are repeated for the second period P2. Otherwise, an alert can be generated in step S714.

It should be apparent that the techniques for generating tracks as described in the embodiments above can be combined in various ways, as well as in combination with some or all of the techniques for generating tracks described in co-pending U.S. patent application Ser. No. 15/425,679.

Figure 10:
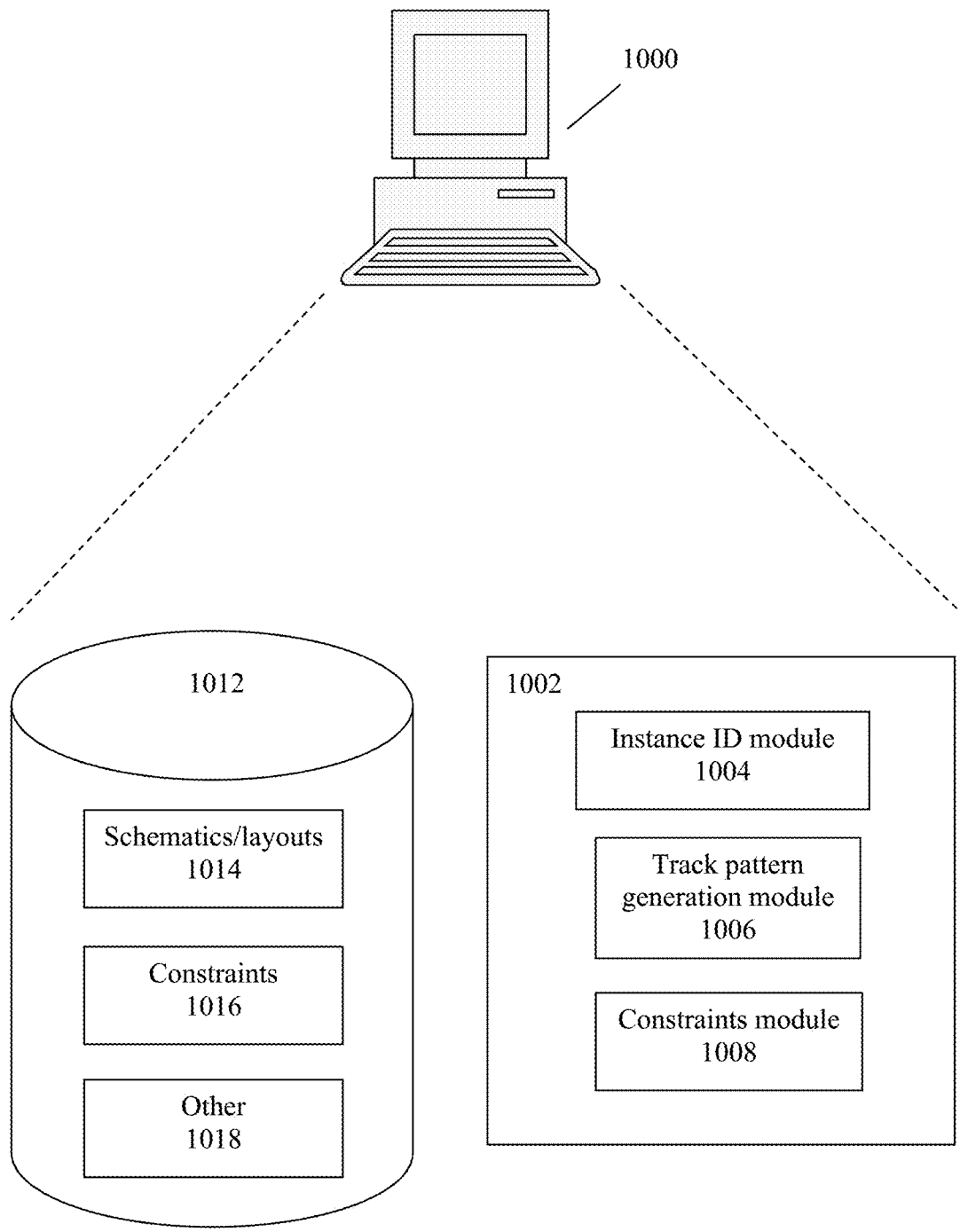
FIG. 10 is a functional block diagram illustrating an example system for generating track patterns in an integrated circuit design according to the present embodiments.

FIG. 10 is a functional block diagram of an example system for automatically generating WSPs for multiple patterning processes according to the present embodiments.

In embodiments, the system 1000 can be one or more general purpose computers that are loaded with software (e.g., EDA tools) and/or customized to include hardware for interactively implementing physical electronic designs. In some embodiments, the one or more computing systems 1000 comprise various components not shown such as processor(s) or processor core(s), memory, disks, etc. The software and/or custom hardware may include interactive or automated modules such as a placer, a routing engine, a layout editor, a design rule checker, a verification engine, or a floorplanner, etc. as will be appreciated by those skilled in the art. The one or more computing systems 1000 may further write to and read from a local or remote volatile or non-volatile computer accessible storage 1012 that stores thereon data or information such as, but not limited to, one or more databases such as schematic design database(s) or physical design database(s) 1014, libraries, data, rule decks, constraints (e.g., track specifications, minimum spacing, widths, BC rules, BCB rules, process rules etc.), etc. 1016, and/or other information or data 1018 (e.g., coloring data) that may be required to support the methodology of the present embodiments. In some embodiments, the one or more computing systems are implemented in a "cloud" configuration and/or a client/server configuration. For example, one or more server computers may be loaded with application software (e.g., a layout editor tool) for implementing some or all of the methodology of the present embodiments, and one or more client computers can communicate with the server computer(s) via a network to perform some or all of the methodology of the embodiments for a particular design.

In some embodiments, the one or more computing systems 1000 may, by various standalone software, hardware modules or combinations thereof 1002 (e.g., EDA tool), include an instance identification module 1004 to identify and analyzing instances for allowing track pattern generation according to the present embodiments, a track pattern generation module 1006 for implementing the track pattern generation methodologies of the present embodiments and one or more modules 1008 to perform constraint (e.g., color, width, alignment, etc.) violation analysis. Additionally or alternatively, any or all of modules 1004, 1006 and 1008 may be implemented by adapting certain pre-existing modules (e.g., placer, layout editor, design rule checker, etc.) with additional functionality as may be required to implement a WSP-aware environment to physically implement electronic designs having generated track patterns according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for physically implementing a design for an integrated circuit, comprising:
   identifying, by a computer, an instance that has been placed in the integrated circuit design;
   identifying, by the computer, first and second pins in the instance;
   determining, by the computer, first and second tracks based on the first and second pins, respectively, wherein shapes placed along the first and second tracks have width and spacing requirements based on the first and second pins, respectively; and
   adding, by the computer, the first and second tracks to a track pattern set for the integrated circuit design to create a new track pattern set,
   wherein the new track pattern set is used as a guide for routing wires during a routing process for physically implementing the integrated circuit design.

2. The method of claim 1, wherein the instance is one of a plurality of instances that have been placed in the integrated circuit design, the method further comprising:
   determining a period for the track pattern set based on determined heights of the plurality of instances.

3. The method of claim 2, wherein determining the period includes determining a least common multiple of the determined heights.

4. The method of claim 2, wherein the first and second tracks belong to a first period, the method further comprising:
   identifying another one of the plurality of instances in a different period than the first period;
   identifying a third pin in the another instance;
   projecting the third pin into the first period with the first and second pins; and
   determining a third track having a width and spacing from the first and second tracks based on the projected third pin; and
   adding the third track to the track pattern set.

5. The method of claim 4, wherein projecting includes:
   determining a third offset with respect to the period of the identified third pin, wherein the first and second pins have first and second offsets with respect to the period, respectively.

6. The method of claim 4, further comprising determining whether the third offset overlaps with either of the first or second offsets.

7. A method for physically implementing a design for an integrated circuit, comprising:
   identifying, by a computer, an instance that has been placed in the integrated circuit design;
   identifying, by the computer, first and second pins in the instance;
   determining, by the computer, first and second tracks having widths and spacing based on the first and second pins, respectively; and
   adding, by the computer, the first and second tracks to a track pattern set for the integrated circuit design,
   wherein the instance is one of a plurality of instances that have been placed in the integrated circuit design, the method further comprising determining a period for the track pattern set based on determined heights of the plurality of instances, and
   wherein the first and second tracks belong to a first period, the method further comprising:
   identifying another one of the plurality of instances in a different period than the first period;

identifying a third pin in the another instance;
projecting the third pin into the first period with the first and second pins; and
determining a third track having a width and spacing from the first and second tracks based on the projected third pin;
determining whether the third offset overlaps with either of the first or second offsets; and
if the third offset overlaps with either of the first or second offsets, determining whether a third color associated with the third pin conflicts with a first or second color associated with the either of the first or second offsets before adding the first, second and third tracks to the track pattern.

8. The method of claim 6, further comprising, if the third offset overlaps with either of the first or second offsets, determining whether a third width associated with the third pin conflicts with a first or second width associated with the either of the first or second offsets before adding the first, second and third tracks to the track pattern.

9. The method of claim 1, further comprising:
determining whether there are any gaps in the track pattern set; and
filling a determined gap in the track pattern set with one or more additional tracks based on an existing spacing between tracks in the track pattern set.

10. The method of claim 1, further comprising:
determining whether there are flipped instances in the integrated circuit design; and
generating additional tracks for the track pattern set to account for one or more flipped instances in the integrated circuit design.

11. A computer readable storage medium having instructions stored thereon which, when executed by a computer, cause the computer to execute a method for physically implementing a design for an integrated circuit, the method comprising:
identifying an instance that has been placed in the integrated circuit design;
identifying first and second pins in the instance;
determining first and second tracks based on the first and second pins, respectively, wherein shapes placed along the first and second tracks have width and spacing requirements based on the first and second pins, respectively; and
adding the first and second tracks to a track pattern set for the integrated circuit design to create a new track pattern set,
wherein the new track pattern set is used as a guide for routing wires during a routing process for physically implementing the integrated circuit design.

12. The computer readable storage medium of claim 11, wherein the instance is one of a plurality of instances that have been placed in the integrated circuit design, the method further comprising:
determining a period for the track pattern set based on determined heights of the plurality of instances.

13. The computer readable storage medium of claim 12, wherein determining the period includes determining a least common multiple of the determined heights.

14. The computer readable storage medium of claim 12, wherein the first and second tracks belong to a first period, the method further comprising:
identifying another one of the plurality of instances in a different period than the first period;
identifying a third pin in the another instance;
projecting the third pin into the first period with the first and second pins; and
determining a third track having a width and spacing from the first and second tracks based on the projected third pin; and adding the third track to the track pattern set.

15. The computer readable storage medium of claim 14, wherein projecting includes:
determining a third offset with respect to the period of the identified third pin, wherein the first and second pins have first and second offsets with respect to the period, respectively.

16. The computer readable storage medium of claim 14, further comprising determining whether the third offset overlaps with either of the first or second offsets.

17. The computer readable storage medium of claim 16, further comprising, if the third offset overlaps with either of the first or second offsets, determining whether a third color associated with the third pin conflicts with a first or second color associated with the either of the first or second offsets before adding the first, second and third tracks to the track pattern.

18. The computer readable storage medium of claim 16, further comprising, if the third offset overlaps with either of the first or second offsets, determining whether a third width associated with the third pin conflicts with a first or second width associated with the either of the first or second offsets before adding the first, second and third tracks to the track pattern.

* * * * *